US009615357B2

(12) United States Patent
Nguyen et al.

(10) Patent No.: US 9,615,357 B2
(45) Date of Patent: Apr. 4, 2017

(54) WIRELESS COMMUNICATION SYSTEM, A BASE STATION AND A METHOD THEREIN

(71) Applicant: NEC Corporation, Tokyo (JP)

(72) Inventors: Phong Nguyen, Victoria (AU);
Yuanrong Lan, Victoria (AU)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/423,846

(22) PCT Filed: Jan. 7, 2014

(86) PCT No.: PCT/JP2014/050607
§ 371 (c)(1),
(2) Date: Feb. 25, 2015

(87) PCT Pub. No.: WO2014/109411
PCT Pub. Date: Jul. 17, 2014

(65) Prior Publication Data
US 2015/0244485 A1    Aug. 27, 2015

(30) Foreign Application Priority Data

Jan. 8, 2013   (AU) ............................... 2013900058

(51) Int. Cl.
*H04W 72/04* (2009.01)
*H04W 72/12* (2009.01)
(Continued)

(52) U.S. Cl.
CPC ........... *H04W 72/0406* (2013.01); *H04J 3/16* (2013.01); *H04L 1/18* (2013.01); *H04L 1/1812* (2013.01);
(Continued)

(58) Field of Classification Search
CPC ........... H04W 72/042; H04W 72/0406; H04W 72/0413; H04W 72/1273; H04W 72/1278;
(Continued)

(56) References Cited

U.S. PATENT DOCUMENTS

2011/0176461 A1   7/2011   Astely et al.
2013/0272170 A1*   10/2013   Chatterjee ............. H04W 28/02
370/280
(Continued)

FOREIGN PATENT DOCUMENTS

WO    2012106840    8/2012
WO    2012165069    12/2012

OTHER PUBLICATIONS

Extended European Search Report dated Jan. 5, 2016; Application No. 15173591.7.
(Continued)

*Primary Examiner* — Ashley Shivers
(74) *Attorney, Agent, or Firm* — Young & Thompson

(57) ABSTRACT

A method is implemented in a base station used in a wireless communications system that supports flexible-TDD (flexible-time division duplex) UL-DL (uplink-downlink) configuration. The method includes configuring a first type of user equipment (UE) with a first type of configuration; configuring a second type of UE with a second type of configuration; and receiving from a user equipment a HARQ-ACK (hybrid automatic repeat request-acknowledgement) signal according to a DL association set. The DL association set includes: a first DL association set for a UL-DL TDD configuration used by the first type of UE; and a second DL association set for a reference UL-DL TDD configuration including a third DL association set for PUCCH resource mapping used by the second type of UE.

14 Claims, 12 Drawing Sheets

(51) Int. Cl.
*H04W 74/00* (2009.01)
*H04L 1/18* (2006.01)
*H04J 3/16* (2006.01)
*H04L 5/14* (2006.01)
*H04L 5/00* (2006.01)

(52) U.S. Cl.
CPC .......... *H04L 1/1861* (2013.01); *H04L 5/0055* (2013.01); *H04L 5/1469* (2013.01); *H04W 72/042* (2013.01); *H04W 72/0413* (2013.01); *H04W 72/0446* (2013.01); *H04W 72/1278* (2013.01); *H04W 74/002* (2013.01); *H04L 5/0082* (2013.01)

(58) Field of Classification Search
CPC ......... H04W 72/1284; H04W 72/1289; H04W 74/006; H04W 74/004; H04W 74/002
See application file for complete search history.

(56) References Cited

U.S. PATENT DOCUMENTS

| | | | |
|---|---|---|---|
| 2014/0119261 A1 | 5/2014 | Wang et al. | |
| 2014/0161001 A1* | 6/2014 | Gao .................. | H04W 72/0446 370/280 |

OTHER PUBLICATIONS

International Search Report PCT/JP2014/050607 dated Apr. 1, 2014.

3rd Generation Partnership Project; Technical Specification Group Radio Access Network; Evolved Universal Terrestrial Radio Access (E-UTRA); Physical Channels and Modulation (Release 10) 3GPP TS 36.211 V10.5.0 (Jun. 2012).
CMCC, Simulation results of flexible TDD UL-DL configuration for Set 2 assumption, 3GPP TSG-RAN WG1 #69 R1-12270, 3GPP, May 25, 2012.
Alcatel-Lucent Shanghai Bell, Alcatel-Lucent, Discussion on HARQ timing with dynamic TDD UL-DL configuration, 3GPP TSG RAN WG1 Meeting #68 R1-120513, 3GPP, Feb. 10, 2012.
Renesas Mobile Europe Ltd., Discussion on Enhancements for Dynamic TDD UL-DL Configuration, 3GPP TSG-RAN WG1 Meeting #69 R1-122363, 3GPP, May 25, 2012.
New Postcom, Remaining issues on support of different TDD UL-DL configurations on different bands, 3 GPP TSG RAN WG1 Meeting #70 R1-123358, 3GPP, Aug. 17, 2012.
CATT, HARQ-ACK feedback for TDD inter-band CA, 3GPP TSG RAN WG1 Meeting #69 R1-122031, 3GPP, May 25, 2012.
Japanese Official Action—2015-148212—May 17, 2016.
United States Official Action—U.S. Appl. No. 14/748,800—Apr. 7, 2016.
LG Electronics, Backhaul Signaling Support for ICIC in Dynamic TDD UL-DL Reconfigurations, 3GPP TSG RAN WG1 Meeting #73, Fukuoka, Japan, May 20-24, 2013, Discussion and Decision, R1-132227, pp. 1-5.
NEC Group, Discussions on Interference Mitigation Scheme in TDD eIMTA, 3GPP TSG RAN WG1 Meeting #73, Fukuoka, Japan, Discussion/Decision, May 20-24, 2013, R1-132330, pp. 1-8.

* cited by examiner

Fig. 3
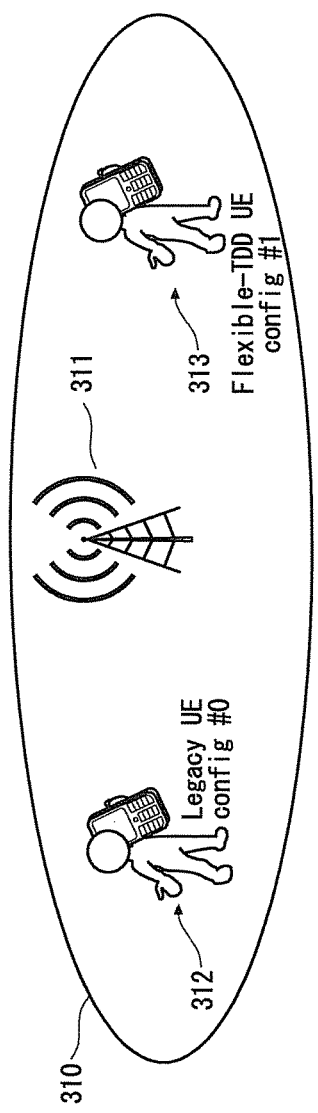
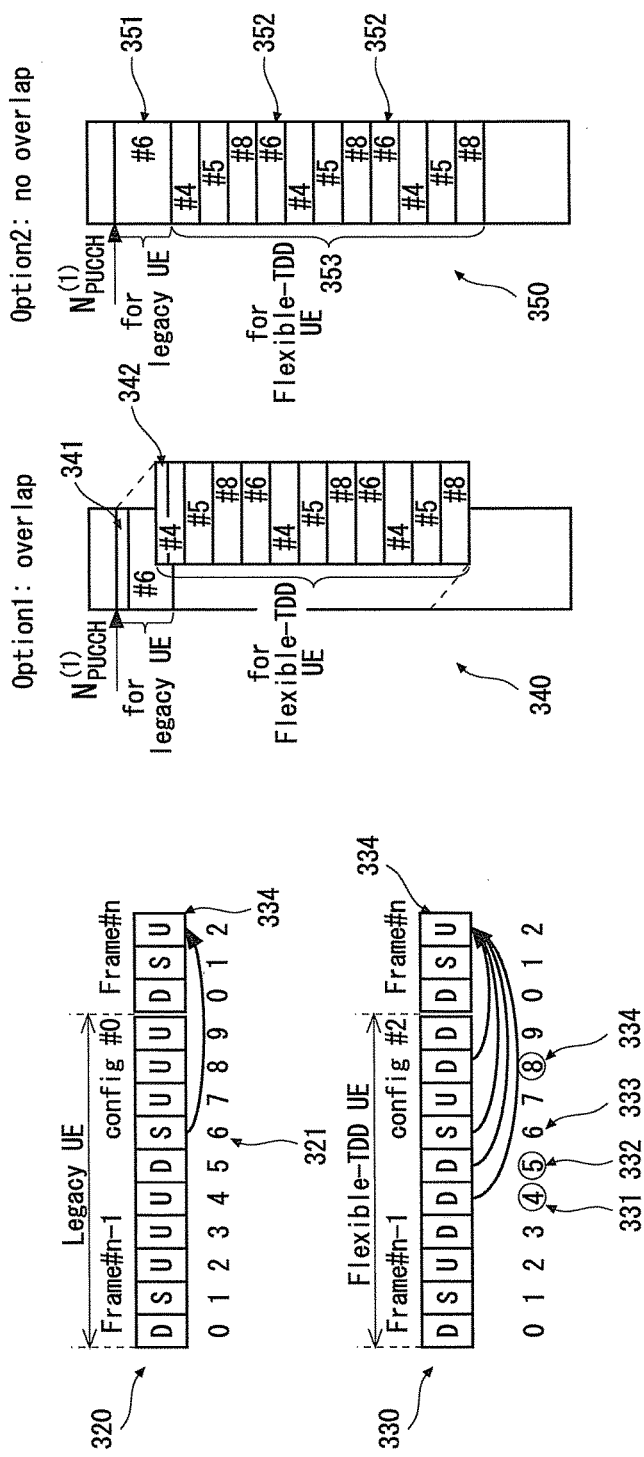

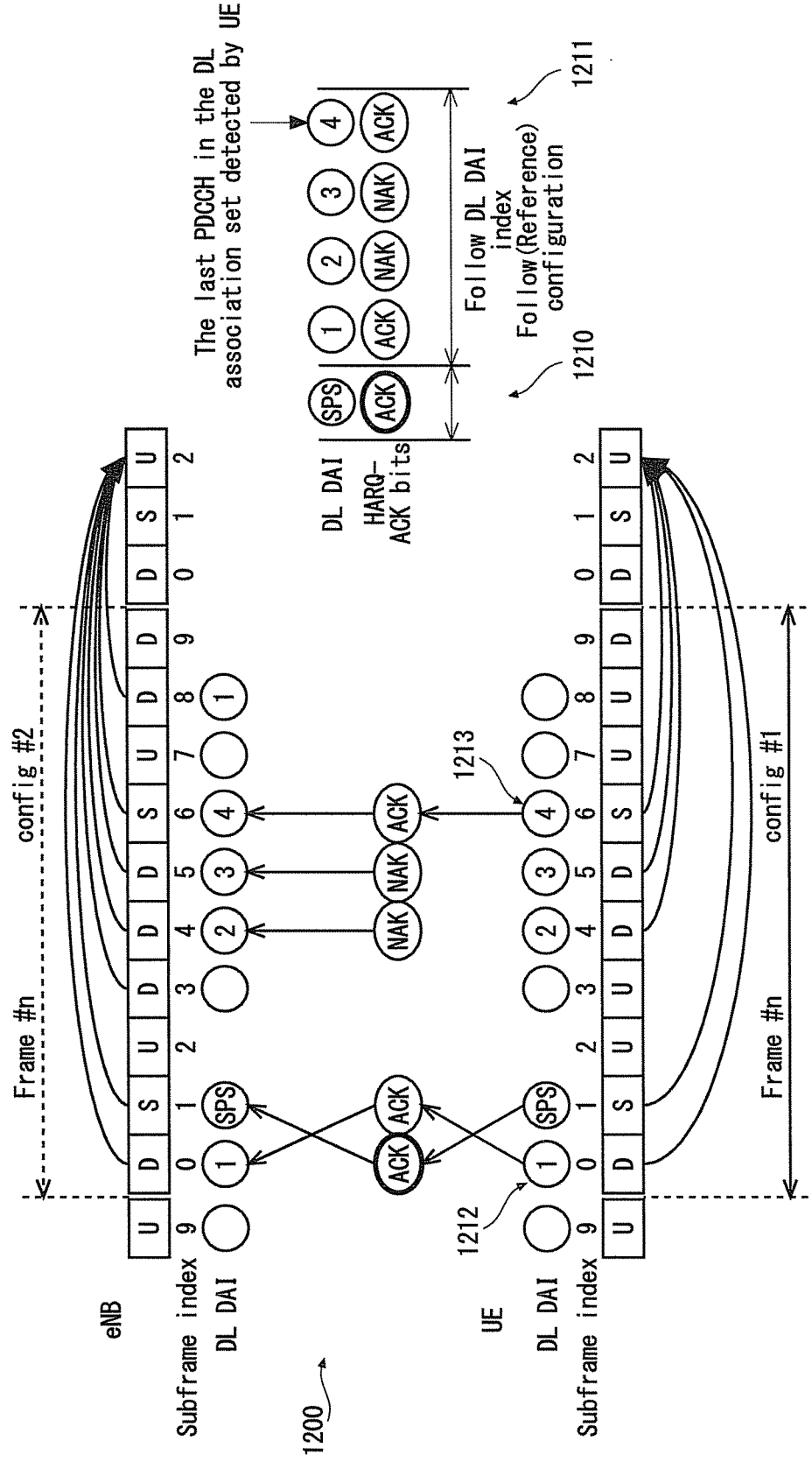

WIRELESS COMMUNICATION SYSTEM, A BASE STATION AND A METHOD THEREIN

TECHNICAL FIELD

The present invention relates to control signalling in communication networks and systems. In particular, although not necessarily exclusively, the present invention is concerned with reserving PUCCH resource for HARQ-ACK feedback, and concatenating HARQ-ACK bits, in wireless communication systems that support flexible-TDD UL-DL configuration.

BACKGROUND ART

The following abbreviations may be found herein:

| | |
|---|---|
| 3GPP | third generation partnership project |
| ACK | acknowledgement |
| CCE | control channel element |
| CRC | cyclic redundancy check |
| DAI | downlink assignment index |
| DL | downlink |
| eNB | node B/base station |
| HARQ | hybrid automatic repeat request |
| LTE | long term evolution |
| LTE-A | long term evolution advanced |
| NACK | negative acknowledgement |
| OFDM | orthogonal frequency division multiplex |
| PDCCH | physical downlink control channel |
| PDSCH | physical downlink shared channel |
| PUCCH | physical uplink control channel |
| PUSCH | physical uplink shared channel |
| RRC | radio resource control |
| SPS | semi-persistent scheduling |
| TDD | time division duplex |
| UE | user equipment |
| UL | uplink |

LTE wireless communication systems aim to provide enhanced services by means of higher data rates and lower latency with reduced cost. One benefit of deploying LTE TDD systems is to enable asymmetric UL-DL allocations in a radio frame. Typically if more data is to be sent in DL, there can be a higher number of DL subframes in a radio frame to accommodate that greater data volume. In LTE TDD systems, the asymmetric resource allocation is realized by providing seven different semi-statically configured UL-DL subframe configurations for a given radio frame, as specified in Table 4.2-2 of 3GPP TS 36.211 v 10.5.0 (2012-06) which is extracted below.

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

These allocations, it can be seen, can provide between 40% and 90% DL subframes, and in conventional practice the UL-DL configuration in use is informed to the UE (and changed) only via system information on the broadcast channel. The UL-DL configuration is only configured semi-statically and so may not adapt to the instantaneous traffic situation. This is inefficient in terms of resource utilization, particularly in small cells/cells with a small number of users where the traffic situation can often change rapidly.

To address this inefficiency, a flexible TDD configuration study item for LTE-A Release 11 was completed. Evaluations in the study item revealed possibly significant performance benefits by allowing TDD UL-DL reconfiguration based on traffic adaptation in small cells. The studies also recommend interference mitigation scheme(s) for systems with TDD UL-DL reconfiguration.

As with asymmetric UL-DL configuration and flexible TDD allocation, there are several challenges to overcome before any implementation may be considered viable. One particular challenge is to allow the reconfiguration of TDD UL-DL configuration on at most a radio frame basis without significant impact on the current 3GPP specification, and to allow coexistence with legacy (i.e. Rel. 8, 9, 10) UEs. It is thought that providing an improved method for PUCCH resource allocation, and for HARQ-ACK concatenation, for use in wireless communication systems that support flexible-TDD UL-DL configuration may help in this regard.

As specified in LTE Rel. 8, 9 and 10 and further illustrated in FIG. 1, one UL subframe is responsible for carrying HARQ-ACK feedback of M DL subframes and/or special subframes, where M is the size of a DL association set as specified in Table 10.1.3.1-1 of 3GPP TS 36.213 (which is the lower table (120) in FIG. 1). In table (120), the DL association set is defined for each UL subframe for different UL-DL configurations. For instance, UL subframe #2 (124) in TDD configuration #3 (125) is responsible for DL transmission which happened k subframes earlier, where the value of k is specified in table (120) by (123), (122) and (121)—that is 7, 6 and 11 subframes earlier. As a result, UL subframe #2 (114) in Frame n+1 is responsible for carrying HARQ-ACK feedback for special subframe #1 (111) (for k=11), DL subframe #5 (112) (for k=7) and DL subframe #6 (113) (for k=6) transmitted in Frame n.

In order to aggregate reserved but unused PUCCH for PUSCH transmission, PUCCH resource for M DL subframes is interleaved. Since at most two OFDM symbols can be used for PDCCH transmission on a special subframe, PUCCH resource for special subframes is mapped later than that of normal DL subframes.

Depicted in FIG. 2 is PUCCH resource reserved in UL subframe #2 in Rel. 10 when UL-DL TDD configuration #3 is used. (211), (221) and (231) is the first CCE (Control Channel Element) and (212), (222) and (232) is the last CCE in PDCCH region of DL subframe #5 (210), DL subframe #6 (220) and special subframe #1 (230), respectively. There is a one-one mapping between CCE index and PUCCH index, and the PUCCH resource for these three DL subframes and special subframes is block interleaved. For instance, PUCCH with index of $N_{PUCCH}^{(1)}+10$ (241) is associated with PDCCH transmission with first CCE index of 11 in DL subframe #5 (210). PUCCH with index $N_{PUCCH}^{(1)}+33$ (242) is associated with PDCCH transmission with first CCE index of 12 in DL subframe #5 (210).

As one candidate solution for maintaining HARQ-timing for Flexible-TDD system, HARQ-timing of reference configuration could be followed for HARQ-ACK feedback for Flexible-TDD UEs. For instance, UL-DL TDD configuration #2 could be used as the reference configuration for UL-DL TDD configuration #0, #1, #2, #6 for DL HARQ-ACK timing. As another example, configuration #5 could be used as the reference configuration for all 7 UL-DL TDD configurations.

As illustrated in FIG. 3, in Flexible-TDD system (310), there are at least two kinds of UEs: (i) legacy UEs (312) which are not aware of the Flexible-TDD configuration, and (ii) Flexible-TDD UEs (313) which have knowledge of both legacy TDD configuration by detecting SIB1 information and Flexible-TDD configuration indicated by the eNB explicitly or implicitly. It is highly likely that the Flexible-TDD configuration may be different from the legacy TDD configuration. For instance with reference to FIG. 3, in subframe n−1, the legacy UE is configured with UL-DL TDD configuration #0 (320) while the Flexible-TDD UE is configured with instantaneous UL-DL configuration #2 (330). Assuming UL-DL TDD configuration #2 is used as reference configuration for HARQ-timing for Flexible-TDD UE, then on UL subframe #2, the legacy UE should feedback HARQ-ACK in UL subframe #2 (334) for DL transmission in special subframe #6 (321) and the Flexible-TDD UE should feedback HARQ-ACK for DL transmission in subframe #4 (331), #5 (332), #6 (333) and #8 (334).

As a result, for the same UL subframe, different DL association sets are used by the legacy UE and Flexible-TDD UE. To be specific, in the above example, DL association set containing only special subframe #6 (321) is used by legacy UE and DL association set containing subframes #4 (331), #5 (332), #6 (333) and #8 (334) is used by Flexible-TDD UE. Since PUCCH is reserved according to the DL association set, if Rel. 10 resource mapping is followed directly by Flexible-TDD UE, then PUCCH collision or low PUCCH efficiency may occur.

By way of further explanation, Option 1 (340) (overlap) in FIG. 3 depicts where the same offset value of $N_{PUCCH}^{(1)}$ is used by legacy UEs and Flexible-TDD UEs. Assuming the first CCE index of PDCCH for one legacy UE in special subframe #6 (321) and one Flexible-TDD UE in DL subframe #4 (331) are both 0, then they will both be mapped to the first PUCCH in the dynamic PUCCH region (i.e. (341) for legacy UE and (342) for Flexible-TDD UE) leading to PUCCH collision. Alternatively, Option 2 (350) (no overlap) in FIG. 3 depicts where PUCCH (353) reserved for Flexible-TDD UE is adjacent to PUCCH (351) reserved for legacy UE. Two copies of PUCCH (351,352) are reserved for special subframe #6 (321,333), thus resulting in low PUCCH efficiency.

It is therefore thought that a new PUCCH resource allocation method for Flexible-TDD UEs which reduces or avoids PUCCH collision and/or achieves higher PUCCH resource efficiency may be desirable.

In PTL1 there is determined a first UL-DL configuration for subframes in a frame, which in various examples is fixed or dynamically allocated. A second UL-DL configuration is semi-statically allocated such as in system information. When mapping automatic repeat request signalling for a first UE which is dynamically allocated an UL-DL configuration, at least some DL subframes mapped by the second UL-DL configuration are excluded by the mapping. In one example, UL resources mapped from a first group of DL subframes are indexed according to the second configuration, and then UL resources mapped from a second group of DL subframes are indexed according to the first configuration, and the excluded DL subframes are within the first group and excluded from the second group and the automatic repeat request signalling is in an uplink resource mapped from the second group.

As well as being fed back on PUCCH, HARQ-ACK can be transmitted on PUSCH even when PUCCH format 1a/1b/3 is configured. For instance when a UE receives an UL grant and simultaneous PUSCH+PUCCH transmission is not configured, then HARQ-ACK bits are concatenated, coded and transmitted with UL data on PUSCH. If a reference configuration is followed for HARQ-timing, the concatenation of HARQ-ACK bits for Flexible-TDD system should also be specified.

It is to be clearly understood that mere reference herein to previous or existing apparatus, systems, methods, practices, publications or other information, or to any associated problems or issues, does not constitute an acknowledgement or admission that any of those things individually or in any combination formed part of the common general knowledge of those skilled in the field, or that they are admissible prior art.

CITATION LIST

Patent Literature

PTL 1: WO 2012/106840

SUMMARY OF INVENTION

Technical Problem

A purpose of the present invention is to provide a wireless communication system, a base system and a method therein that are capable of reducing or avoiding PUCCH collision and/or achieving higher PUCCH resource efficiency.

Solution to Problem

In one form, the present invention relates broadly to a method for PUCCH resource allocation in a wireless communication system that supports flexible-TDD UL-DL configuration, wherein:
different UL-DL TDD configurations are provided and the UL-DL TDD configuration used for flexible-TDD configuration can be different to the UL-DL TDD configuration used for long term UL-DL TDD configuration; and
for a given UL-DL TDD configuration, an UL subframe carries HARQ-ACK feedback of one or more DL and/or special subframes from a previous frame or current frame;
a first DL association set contains one or more DL and/or special subframes for which HARQ-ACK feedback is carried in the UL subframe for the UL-DL TDD configuration in use by a first type of UE;
a second DL association set contains one or more DL and/or special subframes for which HARQ-ACK feedback is carried in the UL subframe for a reference UL-DL TDD configuration in use by a second type of UE;
a third DL association set contains the subframes which are in the second DL association set but excludes any of those subframes which are also in the first DL association set;
the method comprising:
performing PUCCH resource allocation for subframes in the first DL association set by block interleaving and, for subframes in the third DL association set, performing PUCCH resource allocation such that the PUCCH region either follows that of the first DL association set or a specified PUCCH offset is used.

In a slightly more specific embodiment, the invention relates to a method for PUCCH resource allocation in a wireless communication system that supports flexible-TDD UL-DL configuration, wherein:
different UL-DL TDD configurations are provided in which individual subframes are differently allocated as UL, DL or special subframes, and the UL-DL TDD configuration used for flexible-TDD configuration is the same as, or different to, the UL-DL TDD configuration used for long term UL-DL TDD configuration;

a first type of UE is aware of the long term UL-DL TDD configuration in use but is not aware of the flexible-TDD configuration in use, and a second type of UE is aware of both the long term UL-DL TDD configuration in use and the flexible-TDD configuration in use; and for a given UL-DL TDD configuration, an UL subframe carries HARQ-ACK feedback of one or more DL and/or special subframes from a previous frame;

a first DL association set contains one or more DL and/or special subframes for which HARQ-ACK feedback is carried in the UL subframe for the UL-DL TDD configuration in use by the first type of UE;

a second DL association set contains one or more DL and/or special subframes for which HARQ-ACK feedback is carried in the UL subframe for a reference UL-DL TDD configuration in use by the second type of UE;

a third DL association set contains the subframes which are in the second DL association set but excludes any of those subframes which are also in the first DL association set;

the method comprising:
performing PUCCH resource allocation for subframes in the first DL association set according to the Rel. 10 specification and, for subframes in the third DL association set, performing PUCCH resource allocation such that the PUCCH region either follows that of the first DL association set or a specified PUCCH offset is used.

In some embodiments of the above form of the invention, the third DL association set may comprise a first subset containing fixed DL and/or special subframes, and a second subset containing flexible subframes. The method may then comprise performing PUCCH resource allocation for the first subset and the second subset independently. PUCCH resource allocation for subframes in the first subset may be interleaved and reserved according to Rel. 10 specification (block interleaving) and, for subframes in the second subset, PUCCH resource may be allocated to flexible subframes with a higher probability of being used as DL subframes ahead of flexible subframes with lower probability of being used as DL subframes. Alternatively, a UE-specific PUCCH offset may be indicated by RRC-signalling, and the method may then comprise configuring EPDCCH for DL transmission in flexible subframe for the second type of UE wherein PUCCH associated with the EPDCCH set is reserved for subframes with a higher probability of being used as DL subframes, followed by PUCCH for subframes with lower probability of being used as DL subframes.

In some embodiments of the invention there may be one or more particular subframes which are DL subframes in the UL-DL TDD configuration used by the first type of UE, but the corresponding subframe(s) in the UL-DL TDD configuration used by the second type of UE is/are UL subframe(s). Where this is the case, the method may include assigning unused PUCCH resource associated with the UL-DL TDD configuration used by the first type of UE to fixed DL subframe(s) in the UL-DL TDD configuration used by the second type of UE and scheduling only the first type of UE on the fixed DL subframe(s). Also, in these embodiments, collision of transmission may be avoided by following the transmission direction of the second type of UE such that PUCCH reserved for the first type of UE is neither used by the first type of UE because no DL transmission to the first type of UE occurs in the said particular subframe(s), nor is/are the particular subframe(s) used by the second type of UE because it/they is/are UL subframe(s).

There may also be embodiments of the invention where the third DL association set mentioned above comprises a first subset the size of which is dependent on the number of subframes in the first DL association set, a second subset which contains the remaining fixed subframes in the third DL association set, and a third subset which contains flexible subframes in the third DL association set. In these embodiments the method may comprise performing PUCCH resource allocation for the first, second and third subsets independently. PUCCH allocation for any subframes in the second subset may be interleaved and reserved according to Rel. 10 specification and, for subframes in the third subset, PUCCH resource may be allocated after the PUCCH allocation for subframes in the second subset. Furthermore, for subframes in the third subset, PUCCH resource may be allocated to flexible subframes with a higher probability of being used as DL subframes ahead of flexible subframes with lower probability of being used as DL subframes. Alternatively, for subframes in the third subset, a UE-specific PUCCH offset may be indicated by RRC-signalling, and the method may comprise configuring EPDCCH for DL transmission in flexible subframe for the second type of UE wherein PUCCH associated with two EPDCCH set is reserved for subframes with a higher probability of being used as DL subframes, followed by PUCCH for subframes with lower probability of being used as DL subframes.

In another form, the invention relates to a wireless communication system that supports flexible-TDD UL-DL configuration and which operates according to the method in the form of the invention described above. In this other form of the invention, the wireless communication system may include a wireless base station, one or more of the first type of UE and one or more of the second type of UE. The wireless base station may broadcast the long-term TDD UL-DL configuration to the first type of UE and the second type of UE using System Information Block Type 1, and it may broadcast the short-term TDD UL-DL configuration to only the second type of UE in the form of Downlink Control Information transmitted on PDCCH or EPDCCH. The second type of UE may also have a TDD reconfiguration processing function which performs blind detection of the Downlink Control Information and also performs PDSCH HARQ encoding and selects the appropriate UL subframe(s) for sending PDSCH HARQ feedback to the base station.

In yet another form, the invention relates to a method for concatenation of a HARQ-ACK bit set used for HARQ-ACK feedback in a wireless communication system that supports flexible-TDD UL-DL configuration, wherein the HARQ-ACK bit set is divided into: a first part which is based on the value of a DL assignment index which is last detected, a second part which is generated by following a reference configuration, and a third part which is a HARQ-ACK bit for SPS PDSCH. In embodiments of this form of the invention, HARQ-ACK for dynamic PDSCH or PDCCH for DL SPS release may be set to either ACK or NACK depending on the detection result, and if there is no dynamic PDSCH or PDCCH for DL SPS release for one DL DAI value then the HARQ-ACK feedback may be set to NACK.

In a yet further form, the invention relates to a method for concatenation of a HARQ-ACK bit set used for HARQ-ACK feedback in a wireless communication system that supports flexible-TDD UL-DL configuration, wherein the first bit of the HARQ-ACK feedback bits set is dedicated to SPS PDSCH HARQ-ACK no matter whether SPS is activated or not, and the HARQ-ACK bit set is divided into: a first part which includes one HARQ-ACK bit for SPS PDSCH, and a second part which is for dynamic PDSCH or PDCCH for DL SPS release.

In another form, the invention relates to a wireless communication system that supports flexible-TDD UL-DL configuration and which operates according to the method in the form of the invention described in one or other of the previous two paragraphs.

Any of the features described herein can be combined in any combination with any one or more of the other features described herein within the scope of the invention.

Advantageous Effects of Invention

According to embodiments of the above form of the invention stated above, it is possible to provide a wireless communication system, a base system and a method therein for reducing or avoiding PUCCH collision and/or achieving higher PUCCH resource efficiency.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 3 schematically illustrates previous ways of PUCCH resource mapping for Flexible-TDD systems, and problems therewith.

FIG. 12 illustrates an example relating to yet another embodiment referred to as Option B for HARQ-ACK concatenation.

DESCRIPTION OF EMBODIMENTS

Figure 4:
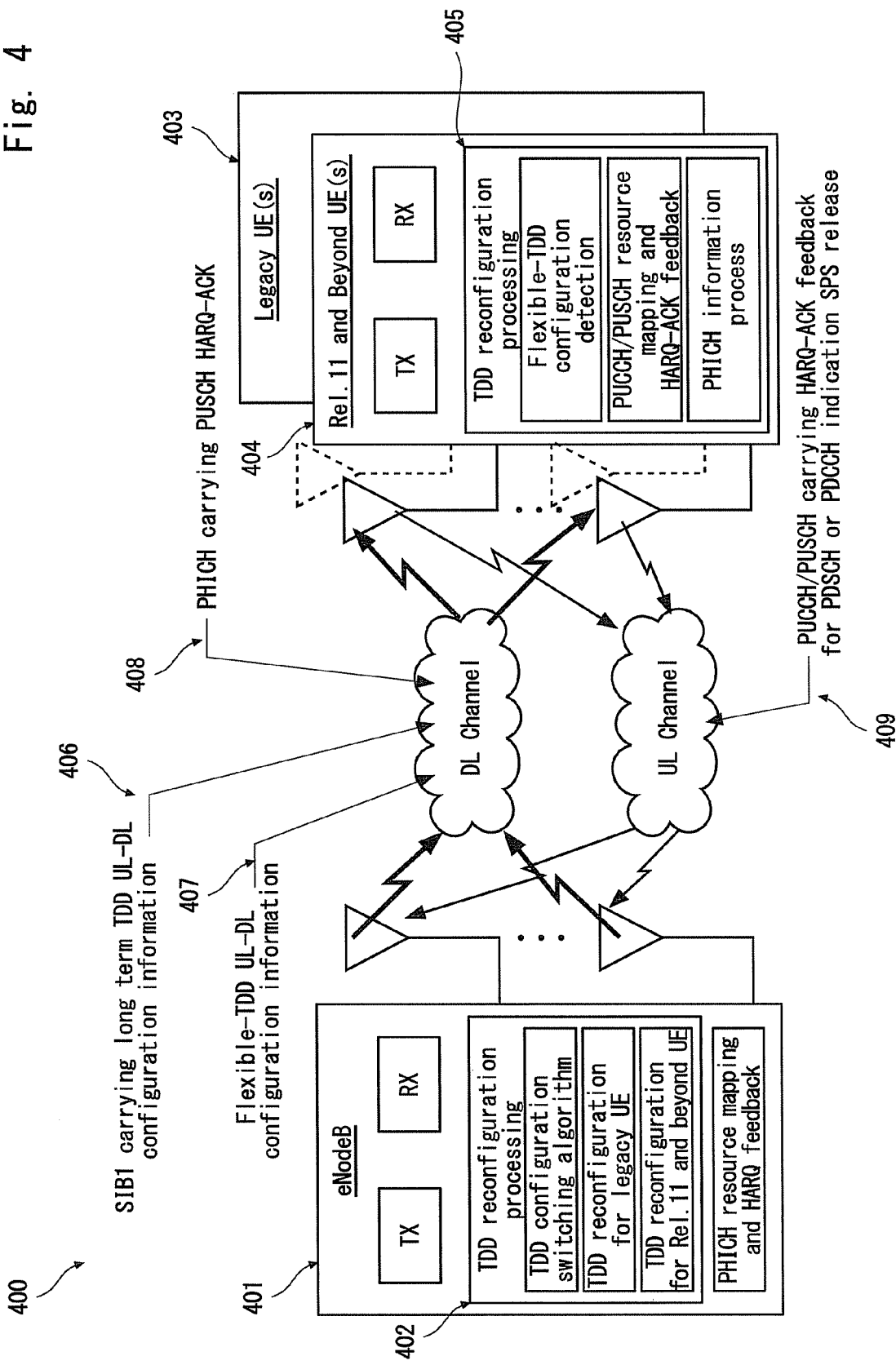
FIG. 4 is a schematic illustration of a Flexible-TDD wireless communication system.

The present invention may be implemented in a wireless communication system that supports Flexible-TDD UL-DL configuration, one example cell of which is shown schematically in FIG. 4. The depicted wireless communication system cell (400) consists of at least one Rel. 11 & beyond eNB (401) which is backward compatible with previous releases such as Rel. 8, Rel. 9 and Rel. 10. The eNB (401) provides wireless connectivity, network access and coverage for one or more legacy UEs (403) as well as one or more Rel. 11 & beyond UEs (404). Rel. 11 & beyond UEs are also referred to herein as Flexible-TDD UEs. The eNB (401) has a TDD reconfiguration processing function (402) which takes the UL-DL traffic ratio observed in unrestricted timeframe into consideration when it performs a TDD configuration switching algorithm for the selection of appropriate long term and short term TDD UL-DL configuration for legacy UEs (403) and Rel. 11 & beyond UEs (404).

The eNB (401) will broadcast a long term TDD UL-DL configuration to legacy UEs (403) and Rel. 11 & beyond UEs (404) using previously proposed SIB1 (System Information Block type 1) (406). The TDD UL-DL configuration transmitted on SIB1 is considered "long term" as the period for SIB1 update is the order of 640 ms. The eNB (401) will also communicate a short term TDD UL-DL configuration to only Rel. 11 & beyond UEs (404) using a fast signalling approach. The eNB (401) transmits the short term TDD UL-DL configuration in the form of a DCI (Downlink Control Information) that is transmitted on PDCCH or EPDCCH (Enhanced PDCCH) within common search space (407). The CRC of this DCI is scrambled with a RNTI (radio network temporary identifier) named "eIMTA-RNTI", which indicates the DCI is used for the purpose of fast TDD UL-DL reconfiguration. The TDD UL-DL configuration included on the new DCI is considered "short term" as the period for TDD UL-DL configuration update can be as low as 10 ms (i.e. radio frame basis).

In addition to receiving and using the TDD UL-DL configuration broadcasted on SIB1, Rel. 11 & beyond UEs (404) operating within range of Rel. 11 & beyond eNB (401) will further have a TDD reconfiguration processing function (405) which performs blind detection of the DCI carrying the updated short term UL-DL configuration information. This function (405) will also perform PDSCH HARQ encoding and select the appropriate UL subframe(s) for sending PDSCH HARQ feedback to the eNB (401). This function (405) will further perform the determination of the DL subframe on which it will monitor for its UL grant and determination of DL subframe on which it will receive PHICH (physical HARQ indicator channel) carrying HARQ corresponding to UL-SCH that it sends in previously granted UL-subframe(s).

For a legacy UE (403) operating within range of the Rel. 11 & beyond eNB (401), it shall use the TDD UL-DL configuration broadcasted on SIB1 and operate according to the legacy specifications that it complies to. The eNB (401) may not schedule legacy UE(s) (403) to perform the reception of PDSCH(s) or transmission of PUSCH(s) on the "flexible subframes".

A first important aspect of at least some embodiments of the present invention relates to the issue of backward compatibility. As a legacy UE has no idea of the Flexible-TDD system, the PUCCH resource reservation method specified in previous Rel. 10 may be (and preferably should be) followed by legacy UEs.

Figure 5:
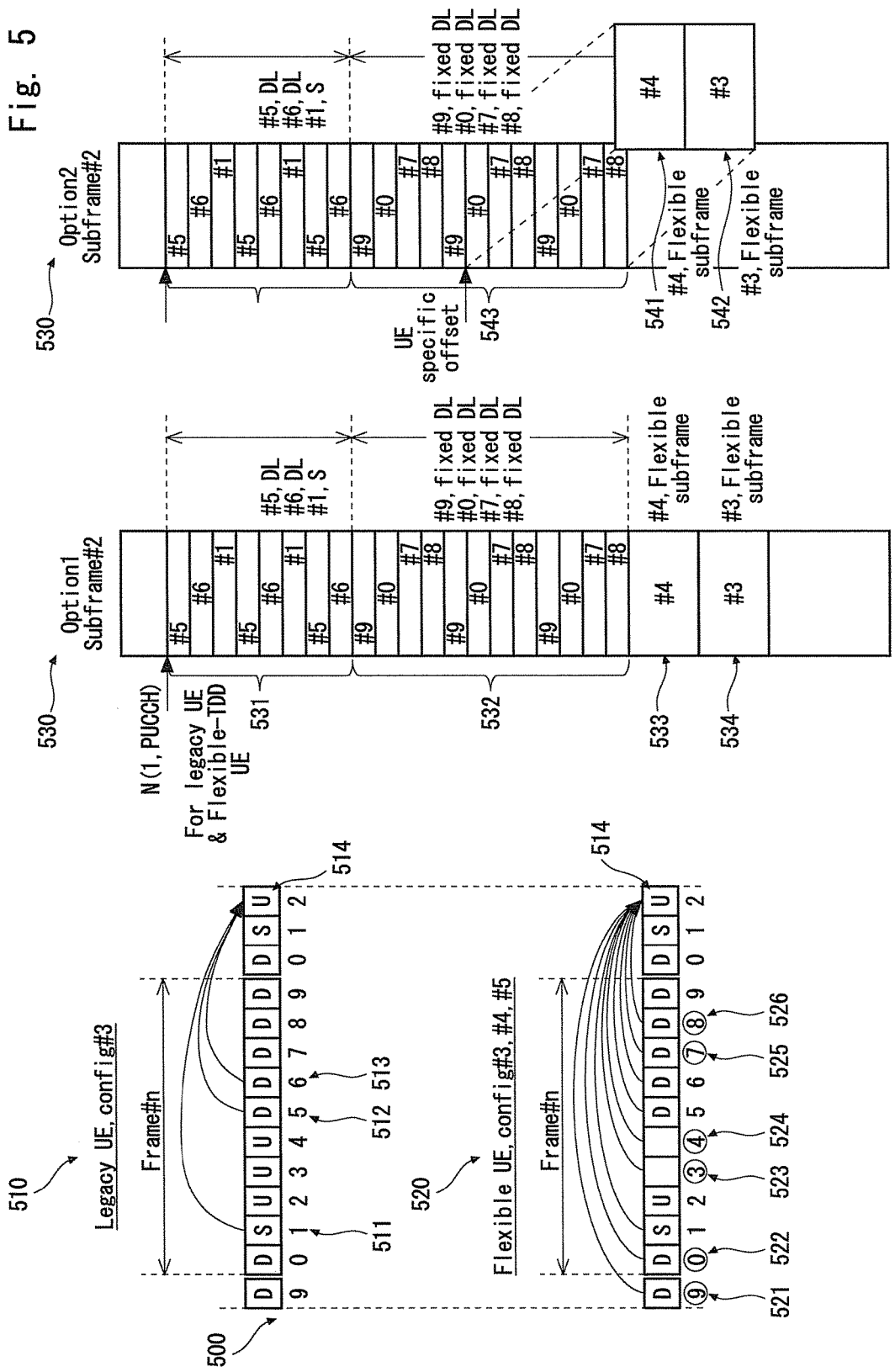
FIG. 5 is schematically represents PUCCH resource allocation for Flexible-TDD systems according to one possible embodiment of the invention referred to herein as Option-X. Note that Option-X includes Option 1 and Option 2 as illustrated in FIG. 5 and discussed below.

As represented in FIG. 5, UL-DL TDD configuration #3 (510) is used by legacy the UE and HARQ-ACK bits for DL subframe #1 (511), #5 (512), #6 (513) are fed back on UL subframe #2 (514) in radio Frame #n+1. The PUCCH resource (531) for the legacy UE is reserved according to the DL association set indicated as item (125) of table (120) in FIG. 1.

A second important aspect of at least some embodiments of the present invention relates to alleviating the influence of ambiguity due to fast TDD configuration between UE and eNB. In a Flexible-TDD system, then maybe ambiguity between UE and eNB in terms of what fast TDD configuration is used for one radio frame. For instance, consider that in Radio Frame #n, the eNB may send a Flexible-TDD configuration of #3 but the UE may somehow interpret this indication as Flexible-TDD configuration #5. This ambiguity may influence the HARQ-ACK even for a subframe which is a DL subframe in both configurations. It should be noted that PUCCH resource reservation for Flexible-TDD systems may not (and preferably is not) related to actual Flexible-TDD configuration detected by a Flexible-TDD UE, but follows the predetermined reference configuration.

A third important aspect of at least some embodiments of the present invention relates to achieving higher efficiency for PUCCH resource reservation. This aspect is addressed by the embodiments described as Option-X and Option-Y below.

Option-X

In order to avoid reserving two copies of PUCCH resource for the same subframe, subframes which are included in the DL association set of legacy UE will not be included in the DL association set of Flexible-TDD UE.

For the convenience of description:

let the DL association set of a legacy UE be referred to as the "DL association set 1" or "set 1", let the DL association set of the reference configuration used by a Flexible-TDD UE be referred to as the "DL association set 2" or "set 2", and let the DL association set of a Flexible-TDD UE for PUCCH resource reservation be referred to as the "DL association set 3" or "set 3".

Figure 1:
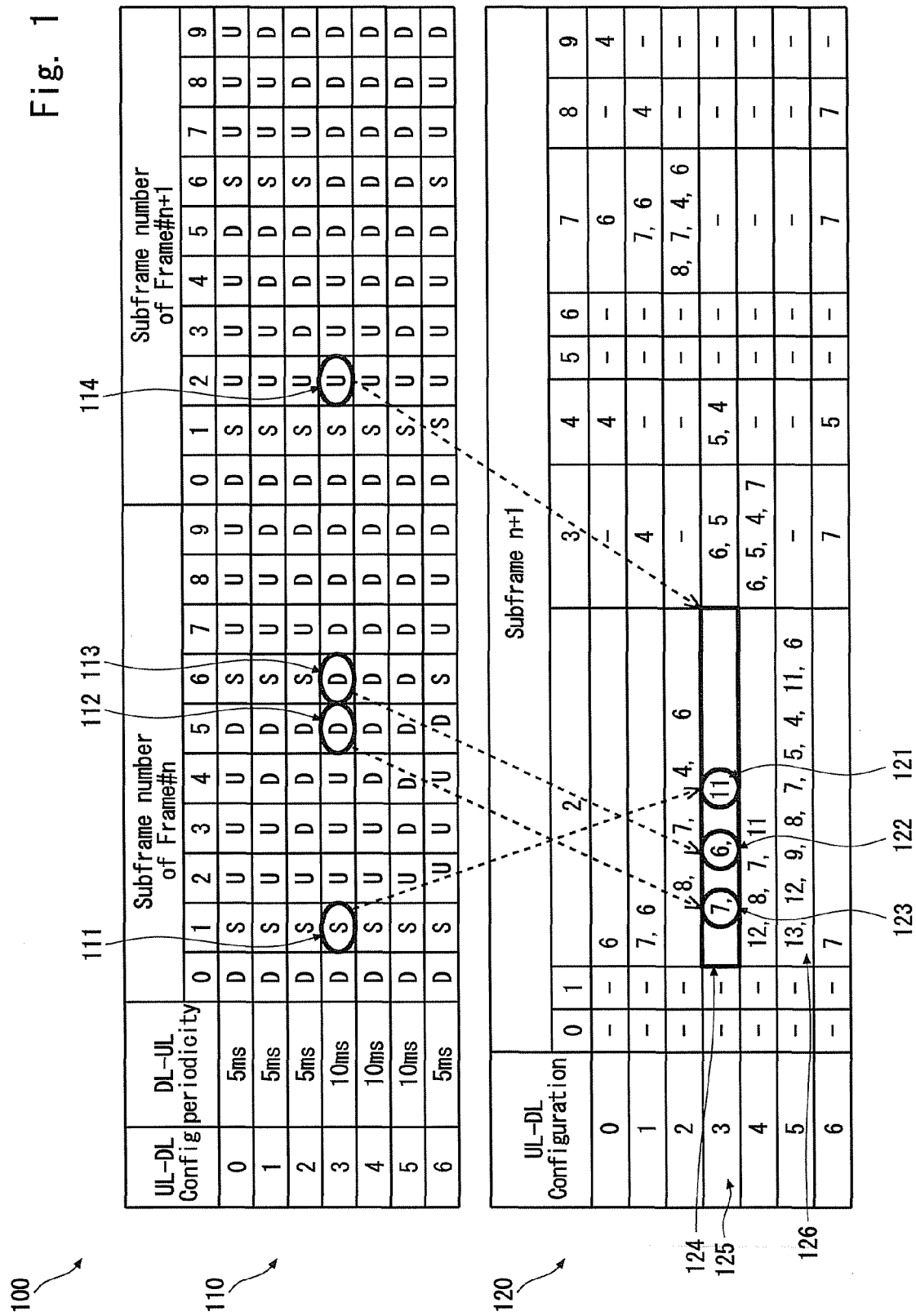
FIG. 1 contains two tables. The upper table is Table 4.2-2 of 3GPP TS 36.211 v 10.5.0 (2012-06) and sets out the allocation of subframes as UL, DL or special subframes in different UL-DL TDD configurations. The lower table is Table 10.1.3.1-1 from 3GPP TS 36.213 and sets out DL association set index K:$\{k_0, k_1, \ldots, k_{M-1}\}$ for TDD systems.
Figure 2:
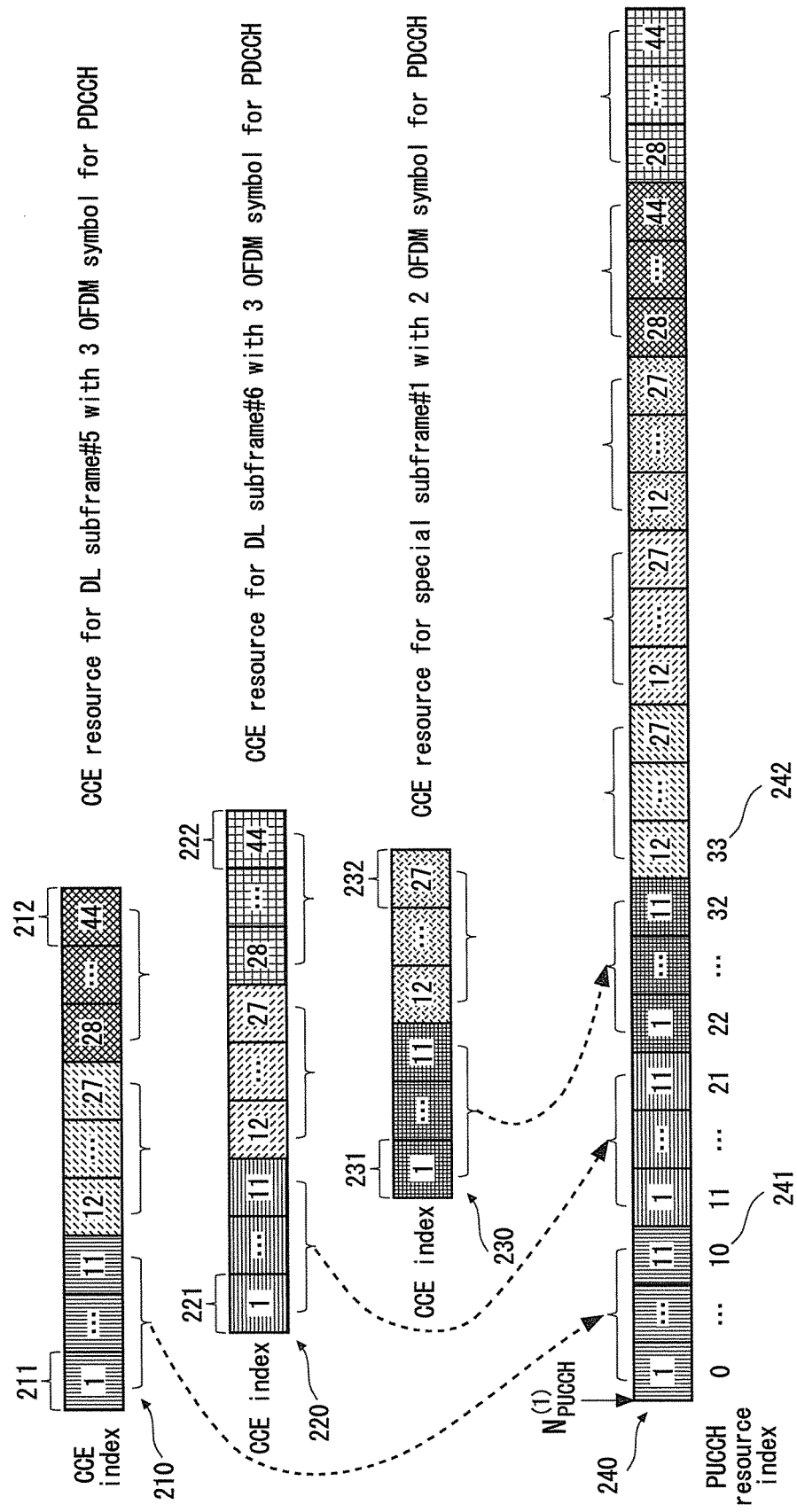
FIG. 2 schematically represents PUCCH resource mapping for TDD systems.
Figure 6:
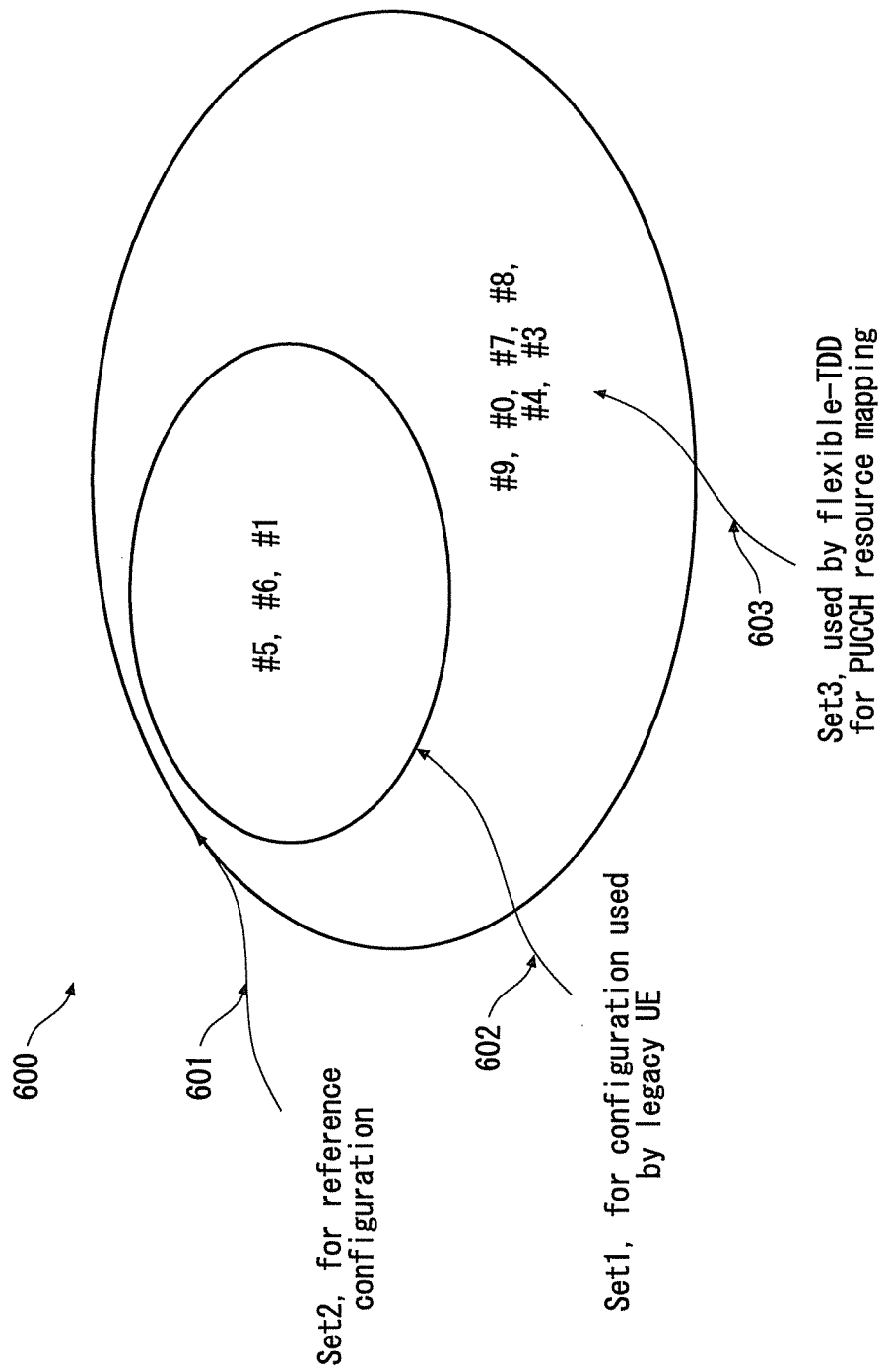
FIG. 6 illustrates DL association sets for Flexible-TDD systems according to Option-X in FIG. 5.

As depicted in FIGS. 5 and 6, assuming UL-DL TDD configuration #3 (510) is used by legacy UEs and either UL-DL TDD configuration #3,#4 or #5 (520) is used by flexible-TDD UEs, DL/special subframes #1 (511), #5 (512) and #6 (513) are included in set 1 (602) for TDD configuration #3 as specified in FIG. 1 (125). Subframes #9 (521), #0 (522), #1, #3 (523), #4 (524), #5, #6, #7 (525) and #8 (526) are included in set 2 (601) for reference configuration #5. In order to achieve higher PUCCH efficiency and avoid reserving redundant PUCCH resource for subframes #1, #5 and #6 (602), DL association set of Flexible-TDD UE, set 3 (603), includes subframes #9 (521), #0 (522), #7 (525), #8 (526), #4 (524) and #3 (523) only.

Resource mapping for the DL association set 1 (602) is straightforward and follows the Rel. 10 specification.

DL association set 3 (603), on the other hand, can be further divided into two subsets; subset 3A and subset 3B. Subset 3A contains fixed DL/Special subframes (i.e. subframe #9, #0, #7, and #8) in subset 3A and subset 3B contains flexible subframes (i.e. subframe #3 and #4) in set 3. The PUCCH resource mapping for these two subsets are carried out independently in order to improve PUCCH efficiency. PUCCH reservation for flexible subframes (523, 524) in FIG. 5 needs special treatment because PUCCH resource reserved for a flexible subframe which is used as an UL subframe will never be used for HARQ-ACK transmission. As mentioned in the Background section above, contiguous PUCCH resource which is not used for HARQ-ACK feedback can be reused for PUSCH transmission. Thus it may be reasonable to reserve one block of PUCCH resource for flexible subframe rather than interleaving with fixed DL/special subframe in the DL association set of Flexible-TDD UE.

As illustrated in FIG. 5, in Option 1 (530) of Option-X, PUCCH resource for fixed DL/special subframes #9 (521), #0 (522), #7 (525) and #8 (526) in the DL association set of the Flexible-TDD UE is interleaved and reserved in PUCCH region as (532) according to the Rel. 10 specification. In relation to the flexible subframes, compared to flexible subframe #4 (524), flexible subframe #3 (523) has a larger possibility of being used as an UL subframe and, as a result, it would be better to reserve PUCCH resource (533) for flexible subframe #4 first, followed by PUCCH resource (534) for flexible subframe #3.

In Rel. 11, EPDCCH is defined for DCI transmission and UE-specific PUCCH offset is indicated by RRC-signalling. As one way to improve PUCCH efficiency, EPDCCH can be configured for DL transmission in flexible subframe for Flexible-TDD UE. As depicted in FIG. 5, in Option 2 (540) of Option-X, UE specific offset (543) is RRC-signalled and PUCCH associated with two EPDCCH set is reserved for flexible subframe #4, followed by PUCCH related to flexible subframe #3.

If a UE is configured to receive EPDCCH on some fixed DL subframes and flexible subframes, then the PUCCH resource is reserved in the order of fixed DL subframe first and flexible later, and flexible subframe with higher probability of being used as DL subframe mapped earlier than those with lower probability.

Option-Y

For some DL subframes of a legacy UE which are used as UL subframes by Flexible-TDD UE, the related PUCCH reserved can be used as PUCCH for fixed DL subframe of Flexible-TDD UE and the subframe index could be different.

Figure 7:
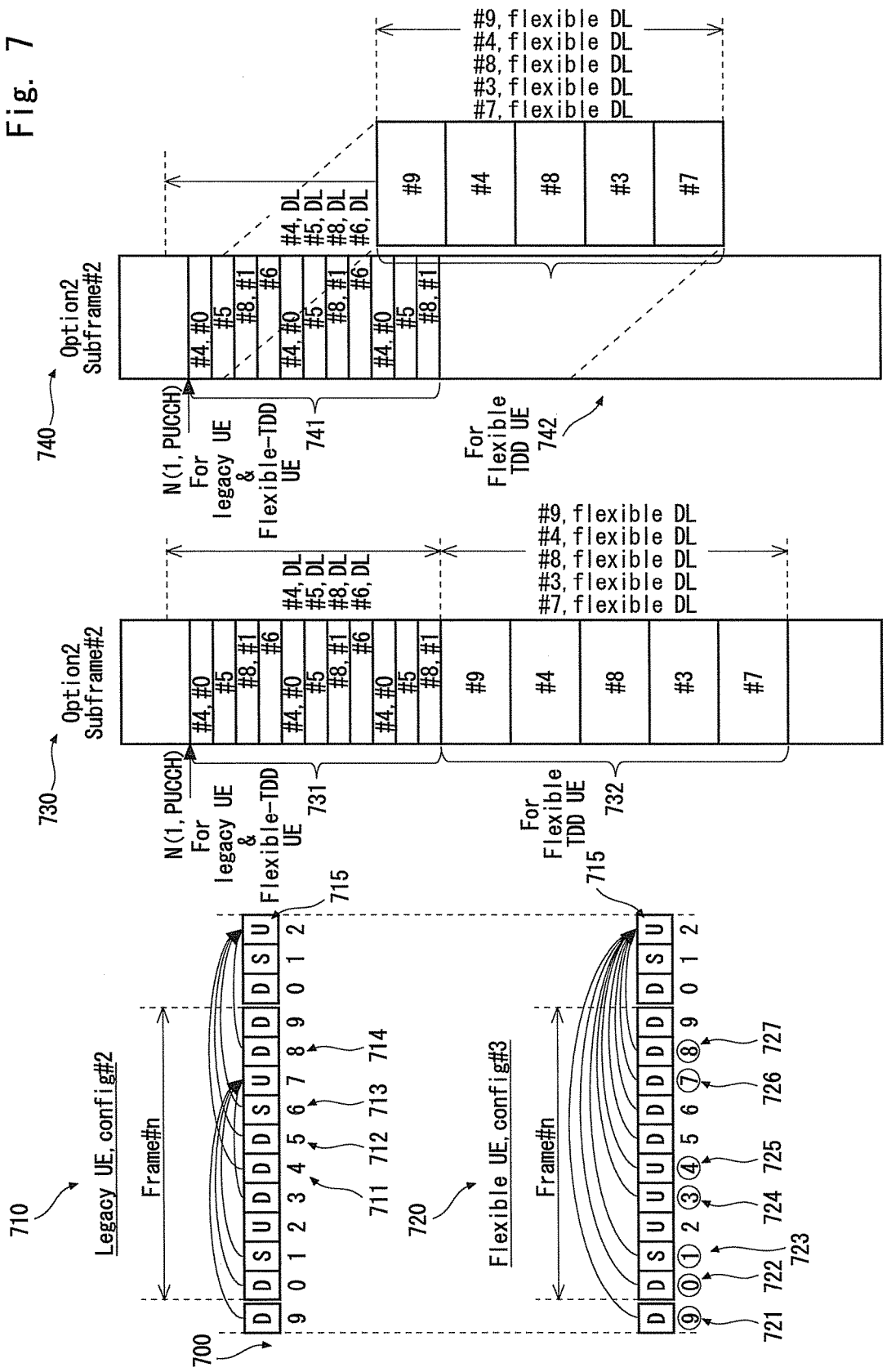
FIG. 7 schematically represents PUCCH resource allocation for Flexible-TDD systems according to another possible embodiment of the invention referred to herein as Option-Y. Note that Option-Y includes Option 1 and Option 2 as illustrated in FIG. 7 and discussed below in FIG. 7

As depicted with reference to example system (700) in FIG. 7, subframe #4 is used as a DL subframe (711) by the legacy UE and is used as an UL subframe (725) by the Flexible-TDD UE. Assume that collision of transmission is avoided by following the transmission direction of the Flexible-TDD UE such that the PUCCH reserved for the legacy UE is neither used by the legacy UE because no DL transmission to the legacy UE occurs in subframe #4, nor is it used by the Flexible-TDD UE because it is an UL subframe. As a result, it would be reasonable to use these PUCCH resources in order to achieve higher PUCCH resource efficiency. One way of achieving this is to assign unused PUCCH resource of legacy UEs to fixed DL subframes of Flexible-TDD UEs and schedule only legacy UEs on Fixed DL subframes.

For the convenience of description, the above definitions of DL association sets are reused.

the DL association set of a legacy UE is referred to as the "DL association set 1" or "set 1", the DL association set of the reference configuration used by a Flexible-TDD UE is referred to as the "DL association set 2" or "set 2", and the DL association set of a Flexible-TDD UE for PUCCH resource reservation is referred to as the "DL association set 3" or "set 3".

Figure 8:
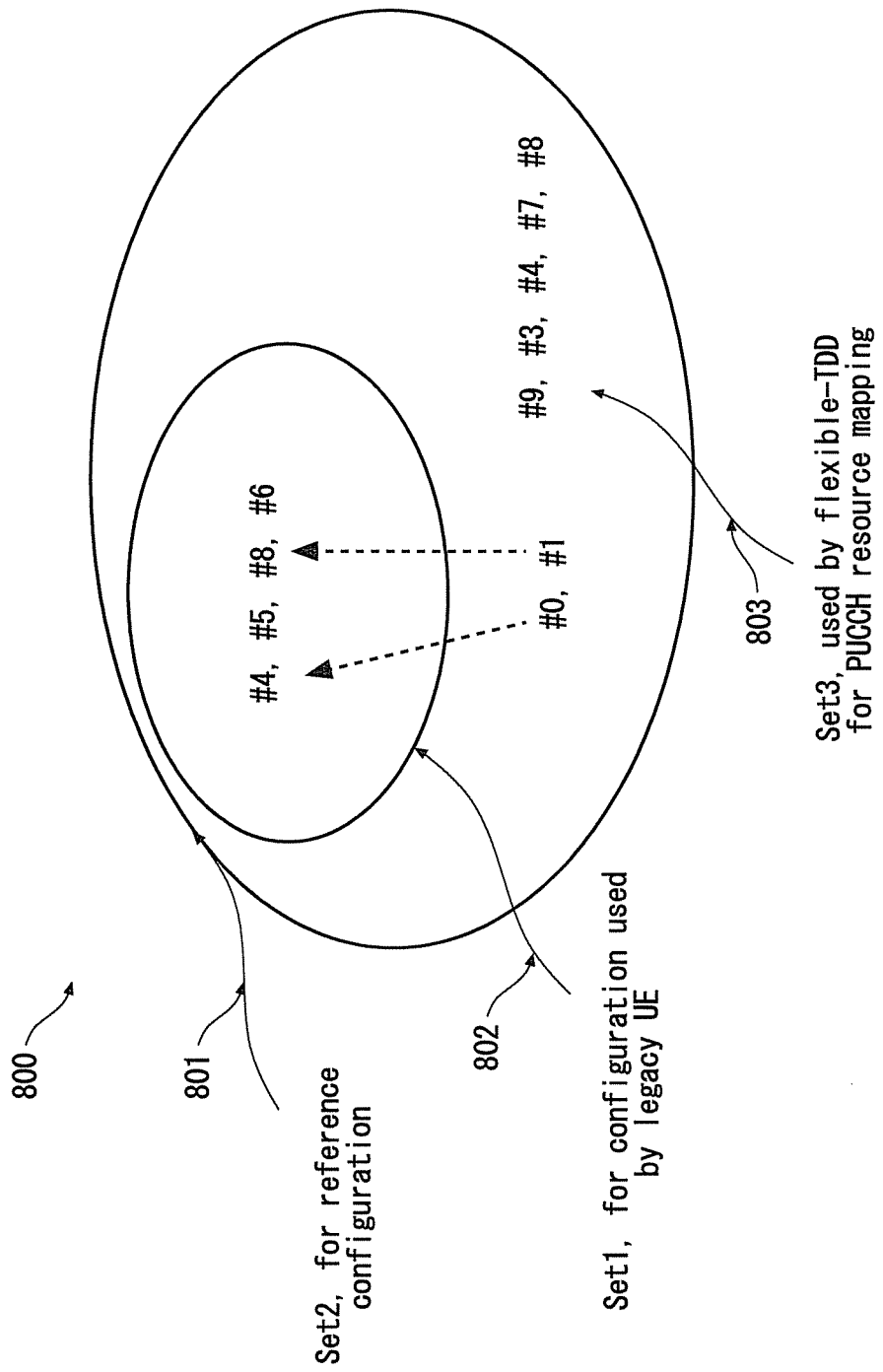
FIG. 8 illustrates DL association sets for Flexible-TDD systems according to Option-Y.

As depicted in FIGS. 7 and 8, DL/special subframes #4 (711), #5 (712), #8 (714) and #6 (713) are included in set 1 (802) for TDD configuration #2 as specified in table (120) of FIG. 1. Subframe #9 (721), #0 (722), #1 (723), #3 (724), #4

(725), #5, #6, #7 (726), #8 (727) are included in set 2 (801) for reference configuration #5. Subframe #0 (722), #1 (723), #5 and #6 are fixed DL subframes and subframe #9 (721), #3 (724), #4 (725), #7 (726) and #8 (727) are flexible subframes that form set 3 (803). In order to reuse legacy PUCCH resource, fixed DL subframe #5 and #6 will map to PUCCH resource of subframe #5 (712) and #6 (713) for legacy UE, and fixed DL subframe #0 (722) and #1 (723) will map to PUCCH resource of subframe #4 and #8 of legacy UE.

On the other hand, DL association set 3 can be further divided into three subsets, subset 3A, subset 3B and subset 3C. Subset 3A contains part of fixed DL/Special subframes in set 3, and the size of subset 3A depends on the number of subframes in set 1 which are used as flexible subframes in the Flexible-TDD system. Subset 3B contains the remaining fixed DL/Special subframes in set 3, and subset 3C contains the flexible subframes in set 3. The PUCCH resource mapping for these three subsets are carried out independently in order to improve the PUCCH efficiency further.

As depicted in FIG. 7, subframes #0 and #1 of Flexible-TDD UE share the same PUCCH resource with subframes #4 and #8 of legacy UE respectively, and no PUCCH resource collision occurs since legacy UE can only be scheduled on fixed DL/special subframe. The size of subset 3B is zero in this example; otherwise a PUCCH interleaving method as specified in legacy system is used. PUCCH resource mapping for subset 3C is the same as above-mentioned method in Option-X. PUCCH is not interleaved and the PUCCH region either follows the PUCCH for subset 3B or uses a UE specified PUCCH offset because ePDCCH in used in flexible subframe by Flexible-TDD UE. The order of PUCCH resource allocation for fixed DL subframe and flexible are the same as Option-X.

Compared to Option-X, Option-Y can achieve higher PUCCH efficiency but at a cost of restricted scheduling of legacy UEs; e.g. it is only possible to schedule legacy UEs for DL transmission on fixed subframes.

A fourth important aspect of at least some embodiments of the present invention relates to achieving a higher coding gain for HARQ-ACK. Initial explanations relating to this (fourth) aspect will be given with reference to the situation where PUCCH format 1a/1b is configured for Flexible-TDD UE and HARQ-ACK bits are transmitted on PUSCH.

As specified in section 7.3 of 3GPP TS 36.213, for TDD HARQ-ACK multiplexing and a subframe n with M>1, spatial HARQ-ACK bundling across multiple codewords within a DL subframe is performed by a logical AND operation of all the corresponding individual HARQ-ACKs. Where a UE is transmitting on PUSCH, the UE determines the number of HARQ-ACK feedback bits $O^{ACK}$ (i.e. the number of bits in the HARQ-ACK feedback bit set) and the HARQ-ACK feedback bits $o_n^{ACK}$, n=0, . . . , $O^{ACK}-1$ to be transmitted in subframe n.

If the PUSCH transmission is not adjusted based on a detected PDCCH with DCI format 0/4 intended for the UE, $O^{ACK}=M$ and $o_i^{ACK}$ is associated with the spatially bundled HARQ-ACK for DL subframe n-$k_i$, where $k_i \in K$, and HARQ-ACK feedback bits without any detected PDSCH transmission or without detected PDCCH indicating downlink SPS release are set to NACK.

For a Flexible-TDD UE, the reference configuration should also be followed in determining the number of HARQ-ACK feedback bits $O^{ACK}$ and the HARQ-ACK feedback bits $o_n^{ACK}$, n=0, . . . , $O^{ACK}-1$ to be transmitted in subframe n.

Figure 9:
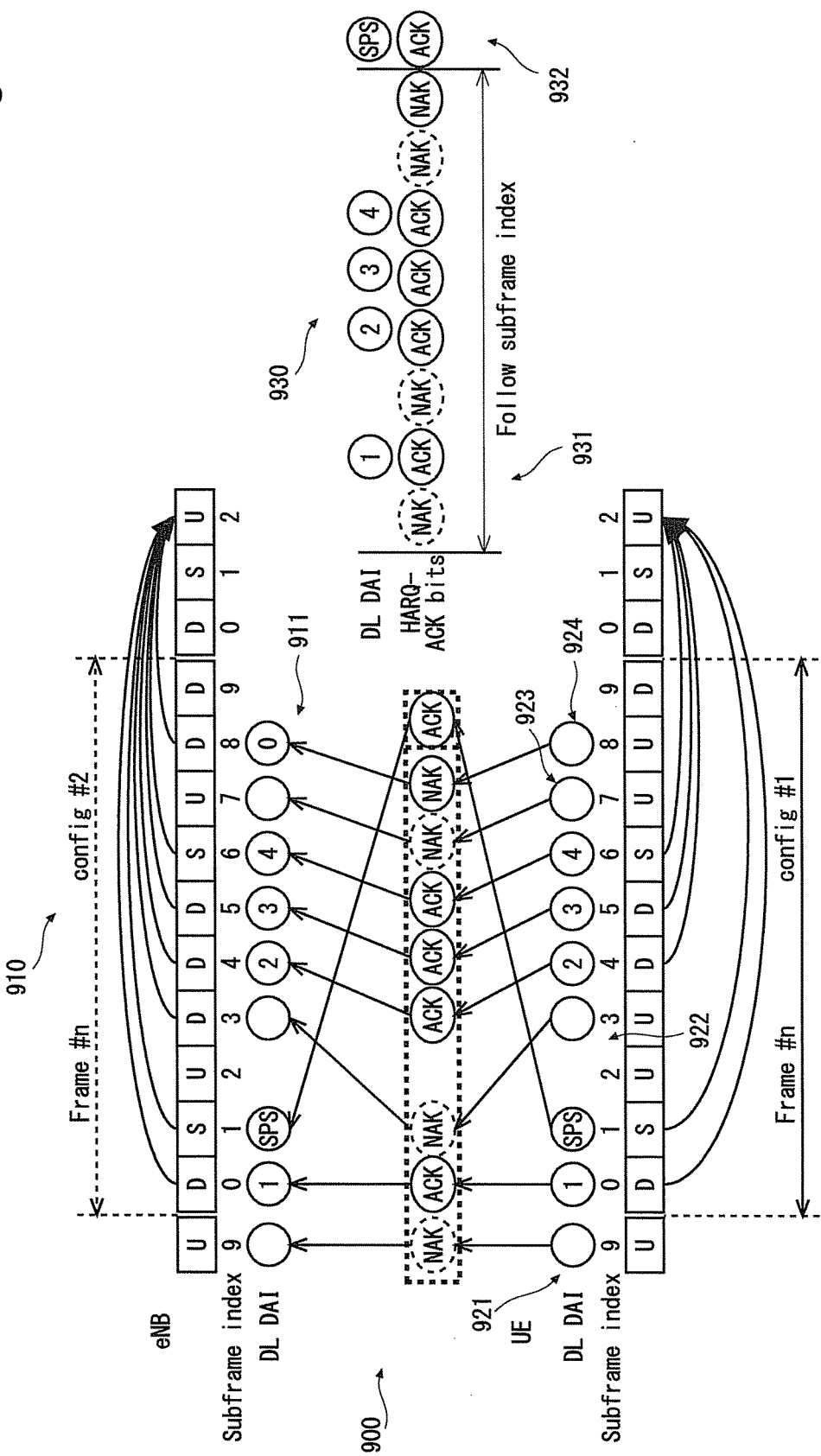
FIG. 9 illustrates HARQ-ACK bit concatenation by following a reference configuration.

For instance, as depicted in FIG. 9, one Flexible-TDD UE mistakenly detects fast TDD configuration as configuration #1 (920) while configuration #2 (910) is used by eNB. The number of HARQ-ACK bits $O^{ACK}=M$, and M is the size of DL association set determined according to the reference configuration (and is unrelated with the actual configuration used by the Flexible-TDD UE).

The HARQ-ACK feedback bits set (930) in FIG. 9 is divided into two parts. The first part (931) is determined according to the reference configuration, and the second part (932) is the last HARQ-ACK bit for SPS (Semi-Persistent Scheduling) PDSCH. Let it be assumed that all PDSCH/PDCCH are successfully decoded, except PDSCH/PDCCH in subframe #8 (911) due to the misinterpretation of the UL-DL configuration by the UE. Accordingly, a dummy HARQ-ACK bit will be fed back for subframes #9 (921), #3 (922), #7 (923) and #8 (924) without any detected PDSCH transmission or without detected PDCCH indicating DL SPS release, as long as this subframe is used as DL subframe in reference configuration. The problem with this scheme is that the percentage of dummy HARQ-ACK bits in the HARQ-ACK feedback bits set is high meaning that coding gain is low. Further coding gain may be achieved by reducing the number of dummy HARQ-ACK bits.

Two possible options for achieving this, referred to as Option A and Option B, are discussed below.

Option A

Figure 10:
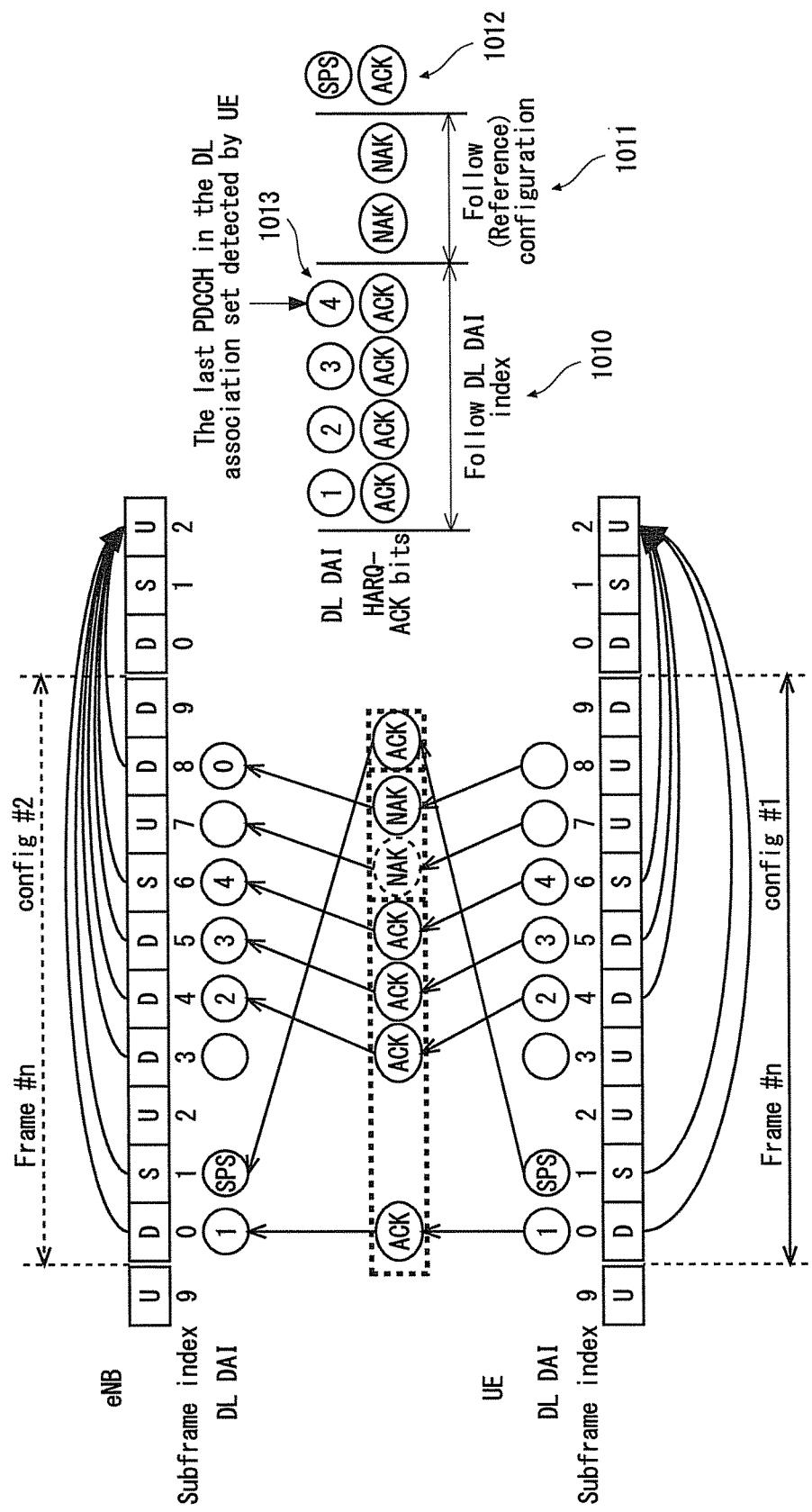
FIG. 10 illustrates an example relating to a different embodiment referred to as Option A for HARQ-ACK concatenation.

In Option A, the HARQ-ACK feedback bits set is divided into 3 parts—see (1010), (1011) and (1012) in FIG. 10. The first part (1010) is based on the value of the DL DAI (Downlink Assignment Index) which is last detected. The second part (1011) is generated by following the reference configuration. And the third part (1012) is a HARQ-ACK bit for SPS PDSCH.

As illustrated in FIG. 10, since the last detected DL DAI value is 4 (1013), there are at least 4 dynamic PDSCH or PDCCH for DL SPS release. HARQ-ACK for dynamic PDSCH or PDCCH for DL SPS release will be set to ACK/NACK depending on the detection result. If there is no dynamic PDSCH or PDCCH for DL SPS release for one DL DAI value, then the HARQ-ACK feedback will be set to NACK. In FIG. 10, the dynamic PDSCH or PDCCH for DL SPS release associated with DAI values 1, 2, 3 and 4 are all successfully decoded and thus the first part (1010) of the HARQ-ACK bits is set to {ACK, ACK, ACK, ACK}.

The second part (1011) of the HARQ-ACK bits is set according to the reference configuration. Since subframes #7 and #8 are used as DL subframes in reference configuration and included in the DL association set, then two dummy HARQ-ACK bits for these two subframes are set to NACK.

The last part (1012) of HARQ-ACK bits is associated with SPS PDSCH. There is at most one subframe within the DL association set used for DL SPS PDSCH, and the last HARQ-ACK bit is set to ACK since this DL SPS PDSCH is correctly detected.

Compared to the HARQ-ACK codebook size (M) specified in Rel. 10, Option A (which is illustrated by example with reference to FIG. 10) drops two dummy HARQ-ACK bits and thus higher coding gain is achieved.

Figure 11:
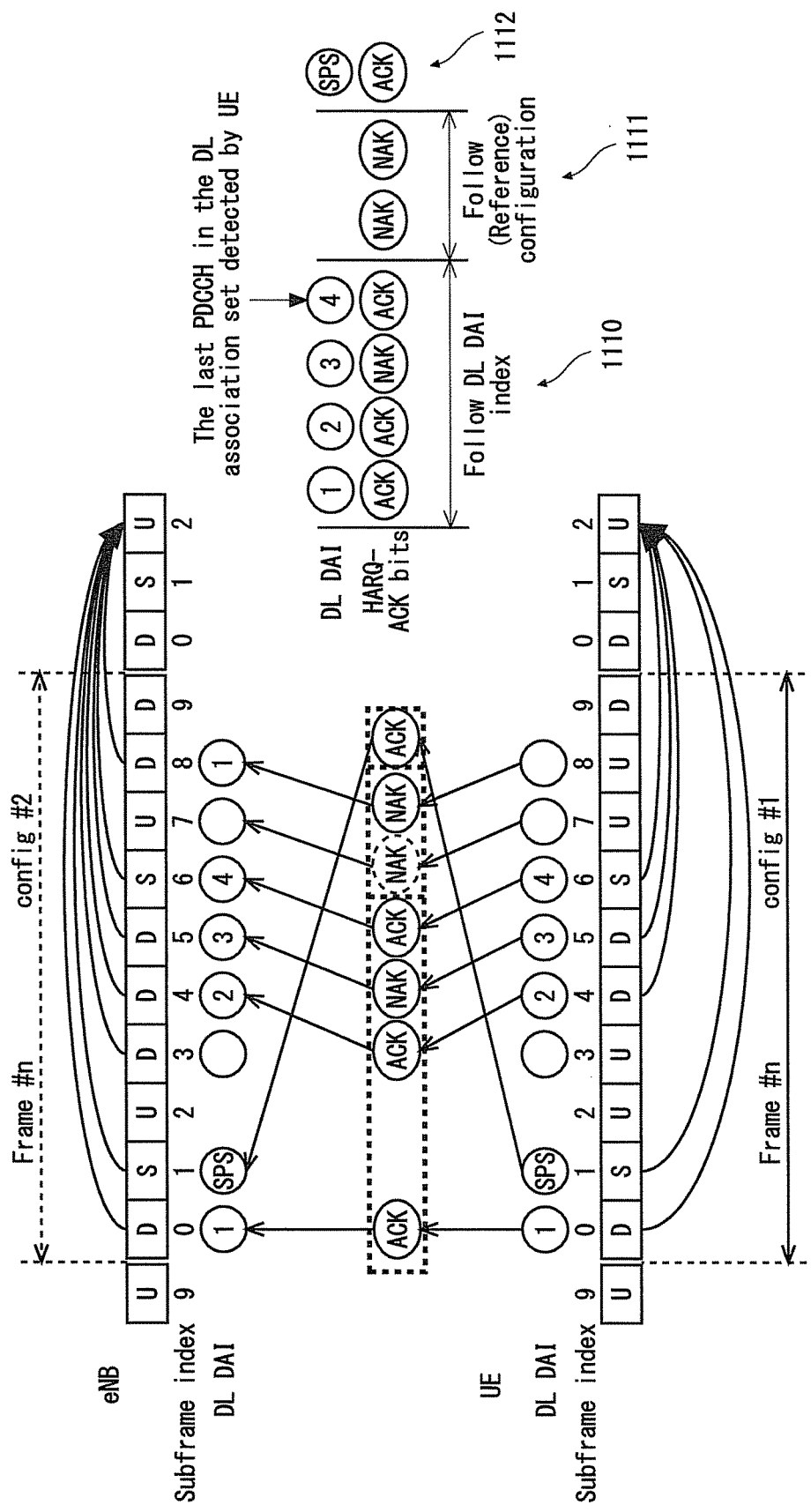
FIG. 11 illustrates another example relating to the Option A embodiment.

FIG. 11 is another example relating to Option A. Compared to the example in FIG. 10, the difference in FIG. 11 is that UE missed the dynamic PDSCH or PDCCH for DL SPS release in subframe #5 and only dynamic PDSCH or PDCCH for DL SPS release with DL DAI value of 1, 2, and 4 are detected. Accordingly, in the example in FIG. 11, HARQ-ACK feedback for DL DAI value of 3 is set to NACK and thus {ACK, ACK, NACK, ACK} is assigned for the first part (1110) of the HARQ-ACK feedback bits set. The second part (1111) stays the same with two dummy HARQ-ACK bits with value of NACK. And the third part (1112) is the last bit in HARQ-ACK bits and related to the decoding result of DL SPS PDSCH.

The first bit (1210) of the HARQ-ACK feedback bits set is dedicated to SPS PDSCH HARQ-ACK, no matter whether SPS is activated or not. And HARQ-ACK bit is associated with DAI value rather than subframe in the DL association set.

From the examples relating to Option A above, it can be seen that dummy HARQ-ACK bits are still padded in order to feedback the HARQ-ACK bits for DL SPS PDSCH correctly. During the process of Rel. 8 standardization, it was proposed that the first HARQ-ACK bit be used as the HARQ-ACK feedback for DL SPS PDSCH if there is one in the DL association set. The problem with this method is that the DL SPS activation command may not be detected by the UE. It is possible that the first HARQ-ACK bit might be used for dynamic PDSCH at the UE side but interpreted as the HARQ-ACK bit of SPS PDSCH and HARQ-ACK bits for dynamic PDSCH or PDCCH for DL SPS release may be started from the second bits. This would disorder the HARQ-ACK feedback for all dynamic PDSCH and lead to incorrect interpretation at the eNB side.

In order to avoid the above problem, it is possible to dedicate the first HARQ-ACK bit (1210) for SPS PDSCH no matter whether DL SPS PDSCH is activated or not. So the HARQ-ACK bit set can be divided into two parts, the first part (1210) includes one HARQ-ACK bit for SPS PDSCH, and the second part (1211) is for dynamic PDSCH or PDCCH for DL SPS release.

As illustrated in FIG. 12, dynamic PDSCH or PDCCH for DL SPS release with DL DAI value of 0 (1212) and 3 (1213) are detected and DL transmissions in subframe #4 and #5 are missed. The first HARQ-ACK bit is assigned with the result of SPS PDSCH detection and if no SPS PDSCH is detected then it is set to NACK. The HARQ-ACK bits concatenation is based on the DL DAI value and the same as the first part in Option A.

Compared to Option A, each HARQ-ACK bit sent by Option 2 is useful and no dummy HARQ-ACK bit is transmitted as thus the maximum coding gain can be achieved.

The explanations relating to the fourth aspect given above refer to the situation where PUCCH format 1a/1b is configured for Flexible-TDD UE and HARQ-ACK bits are transmitted on PUSCH. The following refers to the situation where PUCCH format 3 is configured for Flexible-TDD UE and HARQ-ACK bits are transmitted on PUCCH format 3 or PUSCH for retransmission.

The method specified in Rel. 10 for format 3 is similar to method for PUCCH format 1a/1b when PUSCH for retransmission is used to feedback HARQ-ACK bits. Accordingly, Option A and Option B can be used to concatenate HARQ-ACK bits in order to achieve higher coding gain.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The whole or part of the exemplary embodiments disclosed above can be described as, but not limited to, the following supplementary notes.

(Supplementary note 1) A method for concatenation of a HARQ-ACK bit set used for HARQ-ACK (hybrid automatic repeat request-acknowledgement) feedback in a wireless communication system that supports flexible-TDD (flexible-time division duplex) UL-DL (uplink-downlink) configuration, wherein the HARQ-ACK bit set is divided into 3 parts:

the first part is based on the value of a DL assignment index which is last detected, the second part is generated by following a reference configuration, and the third part is a HARQ-ACK bit for SPS (semi-persistent scheduling) PDSCH (physical downlink shared channel).

(Supplementary note 2) A method for concatenation of a HARQ-ACK bit set as claimed in Supplementary note 1 wherein HARQ-ACK for dynamic PDSCH or PDCCH (physical downlink control channel) for DL SPS release is set to either ACK (acknowledgement) or NACK (negative acknowledgement) depending on the detection result, and if there is no dynamic PDSCH or PDCCH for DL SPS release for one DL DAI (downlink assignment index) value then the HARQ-ACK feedback is set to NACK.

(Supplementary note 3) A method for concatenation of a HARQ-ACK bit set used for HARQ-ACK feedback in a wireless communication system that supports flexible-TDD UL-DL configuration, wherein the first bit of the HARQ-ACK feedback bits set is dedicated to SPS PDSCH HARQ-ACK no matter whether SPS is activated or not, and the HARQ-ACK bit set is divided into two parts:

the first part including one HARQ-ACK bit for SPS PDSCH, and the second part is for dynamic PDSCH or PDCCH for DL SPS release.

(Supplementary note 4) A wireless communication system that supports flexible-TDD UL-DL configuration and which operates according to the method in any one of the preceding Supplementary notes.

(Supplementary note 5) A method for PUCCH resource allocation in a wireless communication system that supports flexible-TDD UL-DL configuration, wherein:

different UL-DL TDD configurations are provided and the UL-DL TDD configuration used for flexible-TDD configuration can be different to the UL-DL TDD configuration used for long term UL-DL TDD configuration;

for a given UL-DL TDD configuration, an UL subframe carries HARQ-ACK feedback of one or more DL and/or special subframes from a previous frame or current frame;

a first DL association set contains one or more DL and/or special subframes for which HARQ-ACK feedback is carried in the UL subframe for the UL-DL TDD configuration in use by a first type of UE;

a second DL association set contains one or more DL and/or special subframes for which HARQ-ACK feedback is carried in the UL subframe for a reference UL-DL TDD configuration in use by a second type of UE;

a third DL association set contains the subframes which are in the second DL association set but excludes any of those subframes which are also in the first DL association set;

the method comprising:

performing PUCCH resource allocation for subframes in the first DL association set by block interleaving and, for subframes in the third DL association set, performing PUCCH resource allocation such that the PUCCH region either follows that of the first DL association set or a specified PUCCH offset is used.

(Supplementary note 6) A method as claimed in Supplementary note 5 wherein the third DL association set comprises:

a first subset containing fixed DL and/or special subframes, and a second subset containing flexible subframes, and the method comprises performing PUCCH resource allocation for the first subset and the second subset independently.

(Supplementary note 7) A method as claimed in Supplementary note 6 wherein PUCCH resource allocation for subframes in the first subset is block interleaved.

(Supplementary note 8) A method as claimed in Supplementary note 6 or 7 wherein, for subframes in the second subset, PUCCH resource is allocated to flexible subframes with a higher probability of being used as DL subframes ahead of flexible subframes with lower probability of being used as DL subframes.

(Supplementary note 9) A method as claimed in Supplementary note 6 wherein a UE-specific PUCCH offset is indicated by RRC-signalling, and the method comprises configuring EPDCCH for DL transmission in flexible subframe for the second type of UE wherein PUCCH associated with the EPDCCH set is reserved for subframes with a higher probability of being used as DL subframes, followed by PUCCH for subframes with lower probability of being used as DL subframes.

(Supplementary note 10) A method as claimed in Supplementary note 5 wherein:

for one or more particular subframes which are DL subframes in the UL-DL TDD configuration used by the first type of UE, the corresponding subframe(s) in the UL-DL TDD configuration used by the second type of UE is/are UL subframe(s), and the method includes assigning unused PUCCH resource associated with the UL-DL TDD configuration used by the first type of UE to fixed DL subframe(s) in the UL-DL TDD configuration used by the second type of UE and scheduling only the first type of UE on the fixed DL subframe(s).

(Supplementary note 11) A method as claimed in Supplementary note 10, wherein collision of transmission is avoided by following the transmission direction of the second type of UE such that PUCCH reserved for the first type of UE is neither used by the first type of UE because no DL transmission to the first type of UE occurs in the said particular subframe(s), nor is/are the particular subframe(s) used by the second type of UE because it/they is/are UL subframe(s).

(Supplementary note 12) A method as claimed in Supplementary note 10 or 11, wherein the third DL association set comprises:

a first subset the size of which is dependent on the number of subframes in the first DL association set;

a second subset which contains the remaining fixed subframes in the third DL association set, and a third subset which contains flexible subframes in the third DL association set, the method comprising performing PUCCH resource allocation for the first, second and third subsets independently.

(Supplementary note 13) A method as claimed in Supplementary note 12 wherein PUCCH allocation for any subframes in the second subset is block interleaved.

(Supplementary note 14) A method as claimed in Supplementary note 12 or 13 wherein, for subframes in the third subset, PUCCH resource is allocated after the PUCCH allocation for subframes in the second subset.

(Supplementary note 15) A method as claimed in Supplementary note 12, 13 or 14 wherein, for subframes in the third subset, PUCCH resource is allocated to flexible subframes with a higher probability of being used as DL subframes ahead of flexible subframes with lower probability of being used as DL subframes.

(Supplementary note 16) A method as claimed in Supplementary note 12, 13 or 14 wherein a UE-specific PUCCH offset is indicated by RRC-signalling, and the method comprises configuring EPDCCH for DL transmission in flexible subframe for the second type of UE wherein PUCCH associated with two EPDCCH set is reserved for subframes with a higher probability of being used as DL subframes, followed by PUCCH for subframes with lower probability of being used as DL subframes.

(Supplementary note 17) A wireless communication system that supports flexible-TDD UL-DL configuration and which operates according to the method in any one of Supplementary notes 5-16.

(Supplementary note 18) A wireless communication system as claimed in Supplementary note 17, wherein the wireless communication system includes a wireless base station, one or more of the first type of UE and one or more of the second type of UE, wherein the wireless base station broadcasts the long-term TDD UL-DL configuration to the first type of UE and the second type of UE using System Information Block Type 1, and the wireless base station broadcasts the short-term TDD UL-DL configuration to only the second type of UE in the form of Downlink Control Information transmitted on PDCCH or EPDCCH.

(Supplementary note 19) A wireless communication system as claimed in Supplementary note 18, wherein the second type of UE has a TDD reconfiguration processing function which performs blind detection of the Downlink Control Information and also performs PDSCH HARQ encoding and selects the appropriate UL subframe(s) for sending PDSCH HARQ feedback to the base station.

(Supplementary note 20) A method substantially as hereinbefore described with reference to any one or more of FIG. 5-8 or 10-12.

This application is based upon and claims the benefit of priority from Australian Patent Application No. 2013900058, filed on Jan. 8, 2013, the disclosure of which is incorporated herein in its entirety by reference.

REFERENCE SIGNS LIST

310 Flexible-TDD system
312 legacy UEs
313 Flexible-TDD UEs
400 wireless communication system cell
401 eNB 402, 405 TDD reconfiguration processing function
403 legacy UEs
404 Rel. 11 & beyond UEs

The invention claimed is:

1. A method implemented in a base station used in a wireless communications system that supports flexible-time division duplex (flexible-TDD) uplink-downlink (UL-DL) configuration, the method comprising:
configuring a first type of user equipment (UE) with a first type of configuration;
configuring a second type of UE with a second type of configuration;
receiving from a user equipment a hybrid automatic repeat request-acknowledgement (HARQ-ACK) signal according to a DL association set, the DL association set comprising:
a first DL association set for a UL-DL TDD configuration used by the first type of UE, and
a second DL association set for a reference UL-DL TDD configuration including a third DL association set for PUCCH resource mapping used by the second type of UE, the third DL association set comprising
a first subset indicating one or more subframes including at least one of a fixed DL subframe and a special subframe, the first subset having a size which is dependent on the number of subframes in the first DL association set which are used as flexible subframes in the second DL association set,
a second subset containing remaining fixed subframes in the third DL association set, and
a third subset which contains flexible subframes in the third DL association set,
performing physical uplink control channel (PUCCH) resource allocation according to the received DL association set,
wherein, for subframes in the second subset, a PUCCH resource is allocated to flexible subframes with a higher probability of being used as DL subframes ahead of flexible subframes with a lower probability of being used as DL subframes, and
the PUCCH resource allocation is performed independently for the first subset, the second subset, and the third subset.

2. The method as in claim 1,
wherein the first type of UE comprises a legacy UE or a 3GPP Release 8, 9, and 10 UE,
wherein the second type of UE comprises a flexible-TDD UE,
wherein the first type of configuration comprises a long term UL-DL TDD configuration, and
wherein the second type of configuration comprises a flexible-TDD configuration.

3. The method as in claim 1,
wherein the first DL association set indicates one or more subframes including at least one of a DL subframe and a special subframe for which a HARQ-ACK feedback is sent to the base station according to the UL-DL TDD configuration,
wherein the second DL association set indicates one or more subframes including at least one of a DL subframe and a special subframe for which a HARQ-ACK feedback is sent to the base station according to the reference UL-DL TDD configuration, and
wherein the third DL association set indicates one or more subframes excluding said one or more subframes indicated by the first DL association set.

4. The method as in claim 3, further comprising:
for said one or more subframes indicated by the first DL association set, performing the PUCCH resource allocation by block interleaving;
for said one or more subframes indicated by the third DL association set, performing the PUCCH resource allocation such that a PUCCH region either follows a PUCCH region of the first DL association set or a specified PUCCH offset is used.

5. The method as in claim 1,
wherein the PUCCH resource allocation is performed independently for said one or more subframes indicated by the first subset and for said one or more subframes indicated by the second subset.

6. The method as in claim 5,
wherein the PUCCH resource allocation for said one or more subframes indicated by the first subset is block interleaved.

7. The method as in claim 5,
wherein a UE-specific PUCCH offset is indicated by radio resource control (RRC)-signalling,
wherein the method further comprises:
configuring an enhanced physical downlink control channel (EPDCCH) for DL transmission in a flexible subframe for the second type of UE, and
wherein a PUCCH associated with the EPDCCH is reserved for a subframe with a higher probability of being used as a DL subframe, followed by a PUCCH for a subframe with a lower probability of being used as a DL subframe.

8. The method as in claim 1,
wherein one or more DL subframes according to the UL-DL TDD configuration comprise one or more UL subframes according to the reference UL-DL TDD configuration, and
wherein the method further comprises:
assigning unused PUCCH resources associated with the UL-DL TDD configuration to a fixed DL subframe in the reference UL-DL TDD configuration; and
scheduling the first type of UE on the fixed DL subframe.

9. The method as in claim 1,
wherein the PUCCH allocation for one or more subframes indicated by the second subset is block interleaved.

10. The method as in claim 1, wherein the performing the PUCCH resource allocation comprises allocating PUCCH resources for one or more subframes indicated by the third subset after the PUCCH allocation for subframes in the second subset.

11. The method as in claim 1, wherein the performing the PUCCH resource allocation comprises allocating PUCCH resources for one or more subframes indicated by the third subset to a flexible subframe with a higher probability of being used as a DL subframe ahead of a flexible subframe with a lower probability of being used as a DL subframe.

12. The method as in claim 1,
wherein a UE-specific PUCCH offset is indicated by radio resource control (RRC)-signalling, and
wherein the method further comprises:
configuring an enhanced physical downlink control channel (EPDCCH) for DL transmission in a flexible subframe for the second type of UE, and
wherein a PUCCH associated with an EPDCCH set of two is reserved for a subframe with a higher probability of being used as a DL subframe, followed by a PUCCH for a subframe with a lower probability of being used as a DL subframe.

13. In a wireless communications system that supports flexible-time division duplex (flexible-TDD) uplink-downlink (UL-DL) configuration, the wireless communications system including a first type of user equipment (UE) and a second type of UE, a method implemented in the second type of UE, the method comprising:
  transmitting to a base station a hybrid automatic repeat request-acknowledgement HARQ-ACK signal according to a DL association set, the DL association set comprising:
    a first DL association set for a UL-DL TDD configuration used by the first type of UE, and
    a second DL association set for a reference UL-DL TDD configuration including a third DL association set for PUCCH resource mapping used by the second type of UE, the third DL association set comprising
    a first subset indicating one or more subframes including at least one of a fixed DL subframe and a special subframe, the first subset having a size which is dependent on the number of subframes in the first DL association set which are used as flexible subframes in the second DL association set,
    a second subset containing remaining fixed subframes in the third DL association set, and
    a third subset which contains flexible subframes in the third DL association set,
  wherein physical uplink control channel (PUCCH) resource allocation is performed according to the transmitted DL association set,
  for subframes in the second subset, a PUCCH resource is allocated to flexible subframes with a higher probability of being used as DL subframes ahead of flexible subframes with a lower probability of being used as DL subframes, and
  the first type of UE is configured with a first type of configuration, and the second type of UE is configured with a second type of configuration, and
  the PUCCH resource allocation is performed independently for the first subset, the second subset, and the third subset.

14. A method implemented in a wireless communications system that supports flexible-time division duplex (flexible-TDD) uplink-downlink (UL-DL) configuration, the method comprising:
  configuring a first type of user equipment (UE) with a first type of configuration;
  configuring a second type of UE with a second type of configuration;
  transmitting from a user equipment to a base station a hybrid automatic repeat request-acknowledgement (HARQ-ACK) signal according to a DL association set, the DL association set comprising:
    a first DL association set for a UL-DL TDD configuration used by the first type of UE; and
    a second DL association set for a reference UL-DL TDD configuration including a third DL association set for PUCCH resource mapping used by the second type of UE, the third DL association set comprising
    a first subset indicating one or more subframes including at least one of a fixed DL subframe and a special subframe, the first subset having a size which is dependent on the number of subframes in the first DL association set which are used as flexible subframes in the second DL association set,
    a second subset containing remaining fixed subframes in the third DL association set, and
    a third subset which contains flexible subframes in the third DL association set,
  performing physical uplink control channel (PUCCH) resource allocation according to the transmitted DL association set,
  wherein, for subframes in the second subset, a PUCCH resource is allocated to flexible subframes with a higher probability of being used as DL subframes ahead of flexible subframes with a lower probability of being used as DL subframes, and
  the PUCCH resource allocation is performed independently for the first subset, the second subset, and the third subset.

* * * * *